United States Patent
Fillman et al.

(10) Patent No.: US 6,487,837 B1
(45) Date of Patent: Dec. 3, 2002

(54) ARTICULARLY MOUNTED BATTERY-POWERED WALK-BEHIND REEL LAWNMOWER

(75) Inventors: Alan R. Fillman, Racine, WI (US); Frank D. Gall, III, Racine, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/873,918

(22) Filed: Jun. 5, 2001

(51) Int. Cl.[7] .................................................. A01D 34/78
(52) U.S. Cl. ........................................... 56/11.9; 56/249
(58) Field of Search ...................... 56/6, 7, 11.9, 13.6, 56/192, 249–254, 208, 209, 294, 1, 2, 12.5

(56) References Cited

U.S. PATENT DOCUMENTS

| | | | |
|---|---|---|---|
| 2,335,054 A | 11/1943 | Godwin | |
| 3,514,926 A | 6/1970 | Heth | |
| 4,769,976 A | 9/1988 | Bassett | 56/7 |
| 5,412,932 A | 5/1995 | Schveler | 56/249 |
| 5,533,326 A | 7/1996 | Goman | 56/7 |
| 5,628,169 A | 5/1997 | Stiller | 56/7 |
| 5,950,409 A | 9/1999 | Davies | 56/249 |
| 6,006,390 A | 12/1999 | Bischel | 15/82 |
| 6,098,388 A | 8/2000 | Davies | 56/249 |

OTHER PUBLICATIONS

Toro Greensmaster 1000 & 500 Advertisement © 1993.
Toro Greensmaster Walk Mowers Advertisement © 1998.
Toro Greensmaster 500 Specifications Advertisement © 1998.
Saxon Industries "Floating Head" GreensMower Ad.–No date.
Toro Greensmaster Flex 21 Advertisement–No date.
Toro Greensmaster Product Profile Advertisement Dated Dec. 2000.

*Primary Examiner*—Robert E. Pezzuto
(74) *Attorney, Agent, or Firm*—Harness, Dickey & Pierce, P.L.C.

(57) ABSTRACT

A walk-behind battery-powered lawnmower having an assembly of a reel unit and a traction unit articularly connected together in an arrangement wherein the reel unit can conform in its vertical position to the elevation of the turf which is being mowed. Thus there is an articular connection between the two units, and the reel unit rides up and down in response to the turf undulations. An electric battery is supported on the traction unit, and there is required only an electric wire connection providing the rotation drive power from the battery to the mower reel. Separate electric controls between the battery and to a motor on the traction unit and one on the reel unit provide for operational speed control to thereby select the clip rate of grass cutting in an articular assembly.

22 Claims, 4 Drawing Sheets

ARTICULARLY MOUNTED BATTERY-POWERED WALK-BEHIND REEL LAWNMOWER

This invention relates to an articularly mounted battery-powered walk-behind reel lawnmower, especially lawnmowers used in mowing golf course greens, tee areas, and the like where ultimate precision of mowing is required.

BACKGROUND OF THE INVENTION

Lawnmowers, such as greensmowers, are known in the art and they commonly employ reel cutters which are used for mowing golf course greens. In mowing present-day greens, it is desired that the grass be cut to a uniform height throughout the entire green. Where the green itself is not completely planar, it is desired that the cutting reel follow the contour of the green even where it has undulations of rises and valleys within the mowing swath presented by the reel.

The present invention provides a lawnmower which is a walk-behind type having minimal impaction of the green; and has maximum manueverability; and is battery powered to have a lack of operation noise; and is arranged to be traction driven while having the cutting reel movable up and down to conform to the undulations of the green. The use of battery power is in contrast to the use of a gasoline powered mower which is inherently noisy and which can drip petroleum onto the green. Also, with a battery there is no air pollution as there is with a gasoline engine.

Another advantage of the present lawnmower is with regard to the modern need of lower cutting heights in order to accommodate increased speeds of the rolling golf ball on the green. Thus the cutting reel must be able to follow the contours of the golf course green. Here there are a traction unit and a reel unit articularly connected together, and the reel unit pivots both fore-and-aft and side-to-side relative to the mowing direction to produce optimum grass cutting.

Still further, the present lawnmower improves upon the gasoline driven mowers which inherently require a mechanical drive connection from the engine to the cutting reel itself. That requires hardware, such as the engine, clutches, gear drives, and a flexible drive shaft, and that prior art tends to restrict the articulation of the reel unit relative to its traction unit which supports the engine. Additionally, in the battery powered lawnmower of this invention, the traction unit and the reel unit each have their own electric drive motors, both of which can be operator-adjustable in speed and thereby select and control the frequency of cut, or clip rate, performed by the reel. That too produces a superior cut of the green.

So, with this battery powered lawnmower, the heretofore mentioned problems are eliminated, and the battery itself can be shifted in its position on the mower to achieve optimum balance for the assembled lawnmower. The reel unit can be easily removed from the traction unit for maintenance and to attach other units to the traction unit.

BRIEF DESCRIPTION OF THE DRAWINGS

FIG. 3 is a front perspective view of a fragment of FIG. 1.

DETAILED DESCRIPTION OF THE PREFERRED EMBODIMENT AND METHOD

Figure 1:
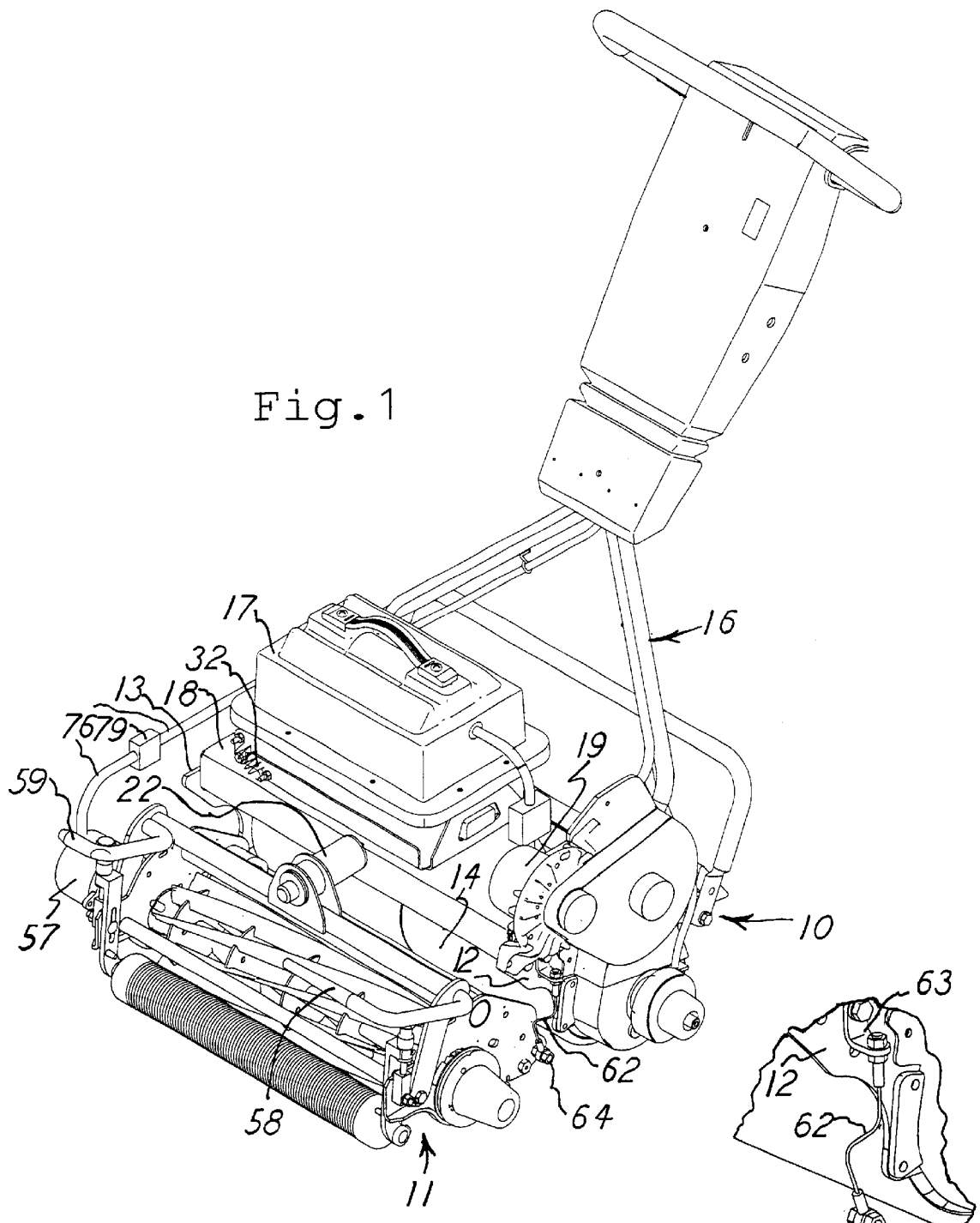
FIG. 1 is a front perspective view of the lawnmower of this invention.

The drawings show a ground supported traction unit 10 and a reel unit 11 which is articularly connected with the traction unit 10. The entire assembly is particularly suitable for mowing the grass on a golf course green where ultimate mowing precision is required. In this arrangement, the mowing unit 11 is in the forward position relative to the mowing direction which is leftward, as viewed in FIG. 1. The articular, or sometimes called pivotal, connection is such that the mower 11 can move up and down in both end-to-end and fore-and-aft relationships, relative to the mowing direction and relative to the traction unit 10. In that universal articular movement, the mower 11 rides on and conforms to the contour of the surface of the green or the like being mowed, thus assuring the ultimate mowing precision.

The traction 10 includes two side plates 12 and 13 and a lawn roller 14 is rotatably supported by the plates and is suitably rotationally driven to propel the assembly on the ground, in the usual arrangement. A handle 16 is attached to the unit 10 for maneuvering the assembly on the ground, and thus the assembly is an operator walk-behind lawnmower, rather that a rider lawnmower.

The lawnmower is battery powered by an electric battery 17 supported on the traction unit frame which includes a platform 18 and the two side plates 12 and 13. An electric motor 19 is supported by the plate 12 and is electrically connected to the battery 17 and the motor 19 is in suitably mechanically connected with the roller 14 to thereby be in driving relationship to the roller 14 to thereby propel the lawnmower.

The traction unit 10 has a horizontally and forwardly extending cylindrically shaped mounting post 21 fixedly mounted on the traction unit 10 and extending centrally therefrom in the forward direction of mowing. The mower unit 11 has a hollow cylinder or sleeve 22 which extends horizontally and onto the post 21 to telescope therewith and be snug thereon. Thus, the inner diameter of the cylinder 22 approximates the diameter of the post 21, and the sleeve 22 is rotatable on the post 21 about the longitudinal axis designated "A" of the post 21. Any suitable means can be employed to secure the sleeve 22 longitudinally to the post 21 and have the sleeve 22 rotatable thereon. Thus, the sleeve 22 is pivotal about the axis A.

Figure 2:
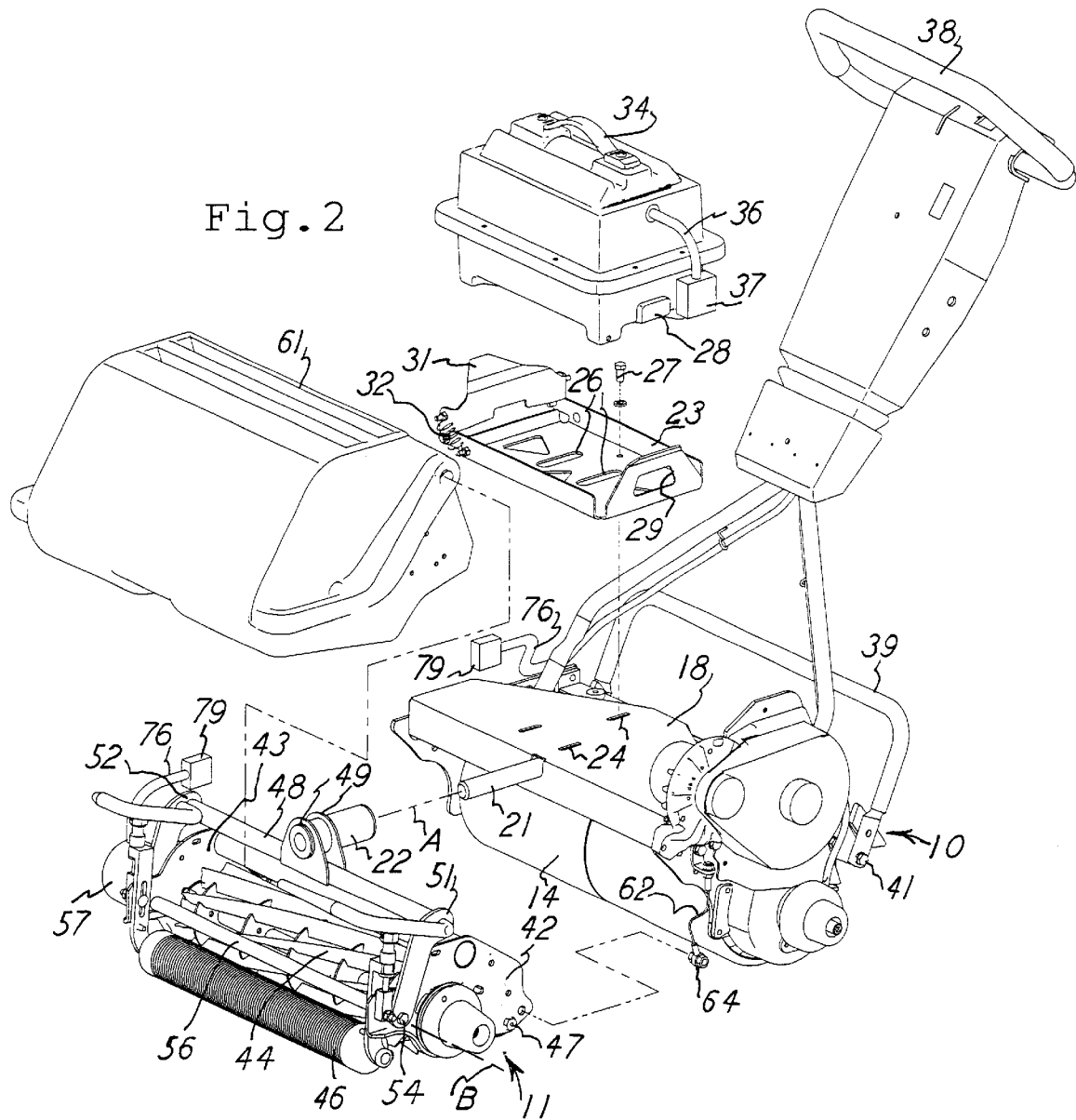
FIG. 2 is an exploded front perspective view of the lawnmower shown in FIG. 1.

Except for the parts as specially described herein, the traction unit is of a conventional construction, and it can have a forward balance relative to the longitudinal line along the circumference of the drum 14 in contact with the ground. As seen in FIG. 2, the battery 17 is supported on a tray 23 which in turn rests on the platform 18. Fore-and-aft extending slots 24 and 26, respectively on the platform 18 and the tray 23, and with bolts, such as bolt 27, provide for fore-and aft adjustable positioning of the battery relative to the remainder of the traction unit 10. In that arrangement, the fore-and-aft balance of the traction unit 10 can be adjusted to thereby place selective downward force on the reel unit 11 through the traction post 21.

The battery 17 is preferably in a box and is held down on the tray 23, or its box bottom, by a battery box projection 28 disposed in a slot 29 in the tray 23 and by a pivoted latch 31 on the tray 17 which snaps onto another but unshown battery box projection which is like the projection 28 and is on the far side of the battery 17. A tension spring 32 holds the latch 31 onto the battery or its box until the operator pivots the latch 31 free of the battery box 17. The operator can then lift the battery off the tray by lifting through a battery handle 34.

Figure 4:
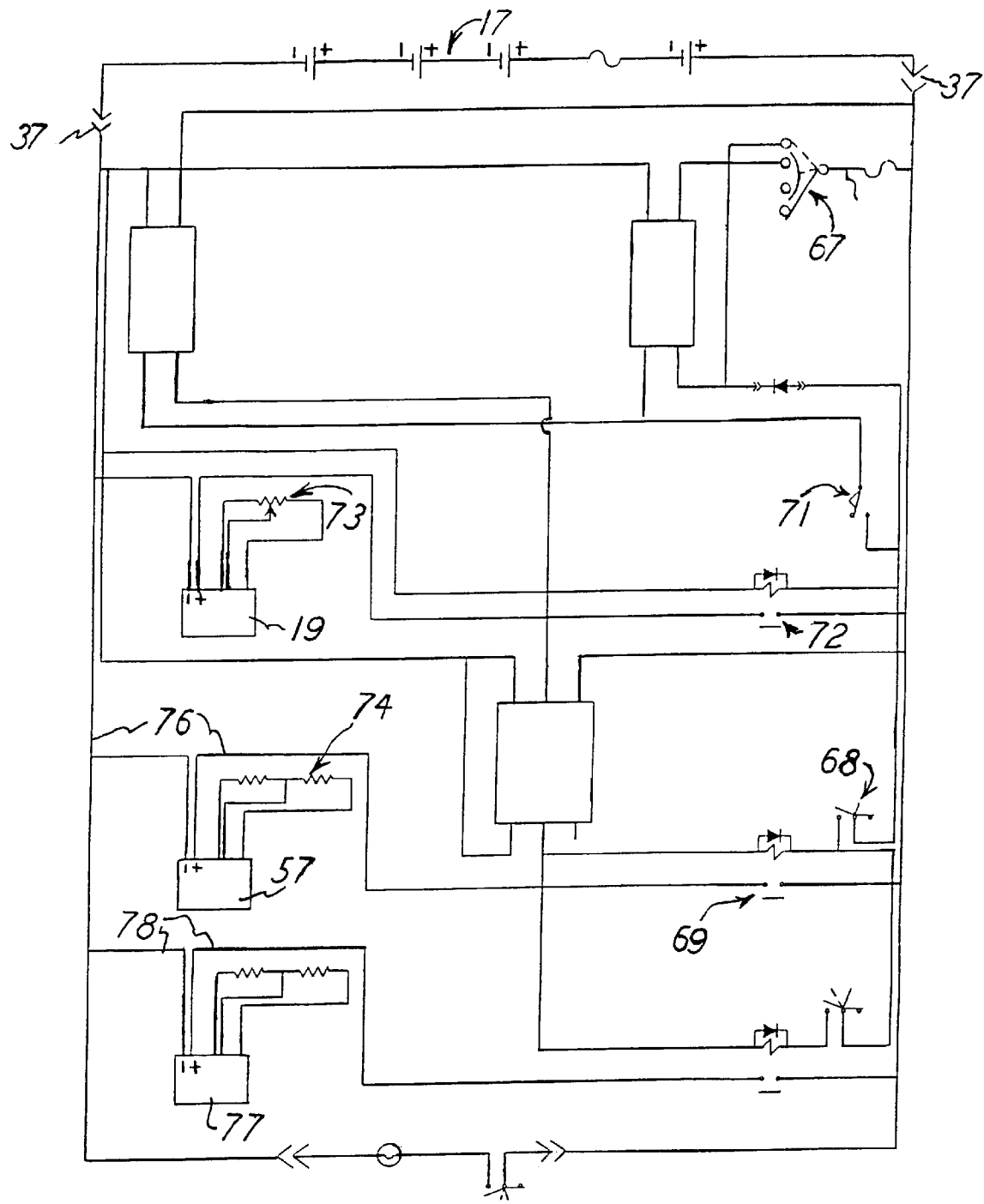
FIG. 4 is a wiring diagram of the electrical system.
Figure 5:
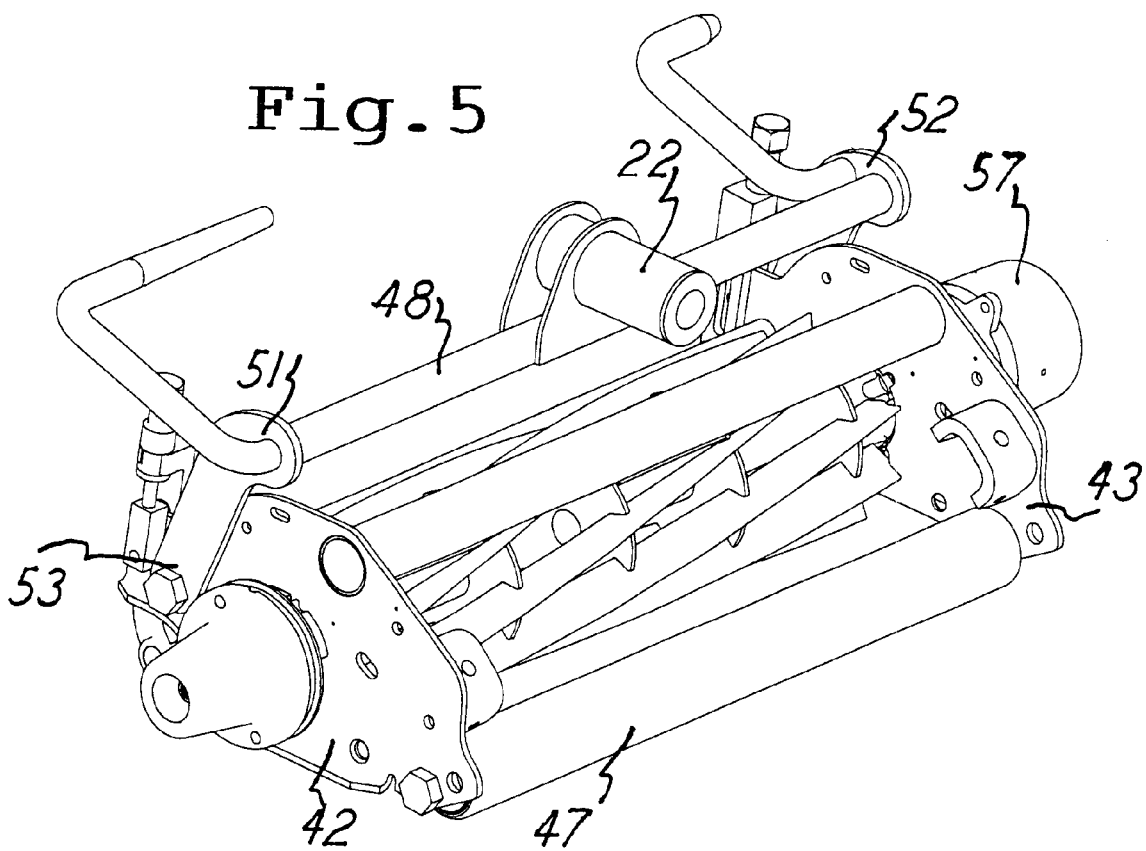
FIG. 5 is a rear perspective view of the reel unit.

An electric wire 36 and a quick disconnect plug 37 extend from the battery 17, and it will be understood that there are additional wires extending from the plug 37 to the remainder of the electric system shown in FIG. 4. Thus the battery can be readily serviced for recharge, replacement, storage, or whatever.

The handle 16 includes an operator's hand grip portion 38, and electric controls are also positioned adjacent the portion 38 for access to the operator and thereby electrically control the assembled mower, as shown in the diagram in FIG. 4.

A floor stand 39 is pivoted at 41 to the traction frame and it can be pivoted clockwise toward the ground or floor to upwardly support the traction unit 10 when free of the reel unit 11 for storage or servicing.

The reel unit 11 includes two side plates 42 and 43 for rotatably supporting the usual cutting reel 44 which is special for golf course green mowing. A reel roller 46 and another but unshown roller on the axis 47 extending between the plates 42 and 43 support the reel unit on the ground. Those two rollers provide for the reel unit 11 to ride on the ground and follow the contour of the ground in its usual up and down undulations. It will be understood that a free-body reel unit 11, that is one without the traction unit 10, will float or move up and down in its movement over the ground being mowed, and it will do so at each reel end adjacent the plates 42 and 43 and also in the plane fore-and-aft in the mowing direction. That is, the reel unit 11 can tip side-to-side and fore-and-aft to thereby track the ground contour and remain in optimum contact with the ground throughout the swath being mowed.

A cross bar 48 is rigidly connected to the sleeve 22, such as by the interconnecting plates 49, and the bar 48 extends from end-to-end of the reel unit and links 51 and 52 are affixed to the two ends of the bar 48 and extend therebelow and slightly forwardly. Thus, up and down movement of each end of the reel unit 11 causes respective up and down movement of the bar 48. The links 51 and 52 have depending ends 53 and they are respectively pivotally pinned to the side plates 42 and 43 by two bolts 54, such as by the shown bolt 54, and they are on a common axis "B" between the bolts 54 and extending across the reel unit 11. That axis B can be concentric with a cross rod 56 extending between the side plates 42 and 43. Thus, the reel unit 11 is free to pivot about the axis B, and such pivoting is determined by the contour of the ground on which the reel unit is riding and as influenced by the two rollers on the reel unit.

FIG. 1 shows there is an electric motor 57 mounted on the plate 53 and it is drivingly connected to the reel 44 to rotate the reel 44 in the cutting action. There are grass catcher mounting tines 58 and 59 respectively affixed to the links 52 and 53 and a grass catcher 61 can be slidably mounted onto the tines 58 and 59.

A flexible cable, such as the shown cable 62 and particularly as seen in FIG. 3, is at each end of the reel unit 11 and the cable upper ends are respectively attached to the traction unit 10 at the respective bracket 63 on the traction unit respective side plates 12 and 13. The respective lower ends of the two cables 62 are attached to the reel unit such as by the shown screw and nut connection at 64 which is affixed to the reel unit side plate 42. So the cables 62 limit the downward movement of the rear of the reel unit 11, and they provide a lost motion connection between the units 10 and 11.

The reel side-to-side action is achieved by the pivot of the reel unit 11 about the axis A in response to the ends of the reel unit adjusting up and down to the ground undulations. The reel unit's fore-and-aft pivoting is about the axis B and is achieved by the pivot of the reel unit in response to the reel unit's fore-and-aft tilt in accord with the two rollers riding on the ground being mowed. The rollers at 46 and 47 are respectively in front of and behind the cutting reel 44. Likewise, the vertical plane of the pivot axis B is between the rollers at 46 and 47.

So the traction unit 10 propels the assembly in the cutting operation and it bears downwardly on the reel unit 11 which is thereby kept firmly on the ground being mowed. That is achieved while the reel unit 11 is capable of the two-way pivot action described above. The geometry is such that the longitudinal axis of the bar 48 is rearward of the vertical plane of the axis B and is in a vertical plane which is between the two reel rollers. So the action of the traction unit 10 on the reel unit 11 is forwardly and downwardly to thereby assure firm reel unit 11 contact with the grass being mowed.

The aforementioned is achieved in a battery powered and walk-behind lawnmower, both features which are optimum preference for a golf course. The achievement does not require a mechanical drive connection between the traction unit and the reel unit, but only the flexible electric wires are employed.

FIG. 4 shows the electric system where the battery 17 is seen electrically connected to various electric components, and the battery connector 37 is seen and there is a key switch 67.

The traction motor 19 and the reel motor 57 are suitably connected in the system with the wires shown. An operator manually controllable switch 68 energizes a contactor 69 which is connected to the reel motor 57. A manually controllable switch 71, which can be a usual mower safety bail switch, energizes a contactor 72 which is connected to the traction motor 19. A variable resistor 73 is controllable by the operator and is connected with the traction motor 19 which can therefor be controlled by the operator to rotate at selective speeds and thus control the movement of the mower on the ground. A resistor 74 is shown connected with the reel motor 57, so the speed of the traction motor 19 determines the clip rate of the cut performed by the rotation and forward movement of the reel 44. The resistor 74 could be under the control of the operator and also be a variable resistor like resistor 73 and then the rotation speed of the reel 44 could be adjusted, as desired. In all events, the rate of cut or clip rate, that is the cuts per increment of forward movement of the entire mower, can be adjusted, as best suited for the quality and preference of cutting.

In all events only the wires, such as the wires 76, are the only so-called rotation drive connection required between the traction unit and the reel unit 11, no mechanical drive connection is required for the rotation of the reel 44.

While the foregoing describes the invention as it relates to a reel mower unit, it is also useful in the inclusion of other implements which can be pivotally attached to the traction unit 10 in the arrangement as shown with the reel unit 11.

The articular arrangement of the traction unit 10 and the driven unit 11 is such that implements other than the shown reel mower can be substituted for the reel unit 11. For instance, there could be a rotationally driven lawn groomer or a sweeper. Ready disconnect of the reel unit 11 will permit the attachment of these unshown other rotational implements. All that is required is the release of the cable 62 and the electric disconnect of the wires 76 and sliding the sleeve 22 off the post 21 after a conventional connector is released from its connection between the sleeve 22 and the post 21 to permit longitudinal movement of the sleeve 22 off the post 21.

The lower portion of the wiring diagram in FIG. 4 shows the substituted implement motor 77 with its wires 78 in the system, and that would be in place of and in the location of the reel motor 57 and its wires 76. An electric quick-disconnect connector 79 connects with the wires 76 or 78, depending on which implement is installed at the time. All is arranged so the implement in use can be readily attached and detached relative to the traction unit 10. Further, the wires provide the rotational drive connection to the motors 57 and 77 and there is the flexibility in that drive connection so the reel unit 11 can articulate, as described.

What is claimed is:

1. An articularly mounted battery-powered walk-behind reel lawnmower comprising:

a traction unit supportable on turf to be mobile thereon, a walk-behind operator handle attached to said traction unit for maneuvering said traction unit on the turf, an electric battery on said traction unit, an electric motor on said traction unit for powering said traction unit on the turf, a grass cutting reel unit articularly connected to said traction unit for pivotal movement relative to said traction unit and for movement in a direction of mowing and having a length extending transverse to said direction and with said length having two terminal ends, a ground engagable roller rotatably mounted on said reel unit for contacting the turf and rolling thereon in constant contact therewith and thereby move up and down relative to said traction unit and in response to undulations in the turf and thereby pivot said reel unit upwardly both along the entire said length and also individually at each said terminal end in accord with mowing movement over the undulations, an electric motor on said reel unit for powering said reel unit in mowing, articular connectors interconnected between said units for limiting downward movement and the pivoting of said reel unit downwardly relative to said traction unit, and flexible electric wires electrically connected between said battery and said reel unit for transmitting electricity to said electric motor on said reel unit and accommodating the pivoting of said reel unit.

2. The articularly mounted battery-powered walk-behind reel lawnmower as claimed in claim 1, wherein:

said connectors include an interconnection between said units and having a pivot axis extending in the mowing direction, and said connectors including a link at each terminal end of said reel unit and being pivotally interconnected between said interconnection and said reel unit for transmitting the movement of said traction unit to said reel unit and for guiding said reel unit in up and down movement of said reel unit relative to said traction unit.

3. The articularly mounted battery-powered walk-behind reel lawnmower as claimed in claim 2, wherein:

said interconnection includes a pivot post and a sleeve telescoped on said post and extending along said pivot axis and being separately affixed to said traction unit and said reel unit.

4. The articularly mounted battery-powered walk-behind reel lawnmower as claimed in claim 3, wherein:

said connectors include a flexible cable connected between said traction unit and said reel unit for upwardly supporting said reel unit relative to said traction unit.

5. The articularly mounted battery-powered walk-behind reel lawnmower as claimed in claim 4, including:

there being two of said ground engaging roller on said reel unit with one thereof being in a forward direction and the other thereof being in a rearward direction relative to the mowing direction.

6. The articularly mounted battery-powered walk-behind reel lawnmower as claimed in claim 1, including:

a traction drum included in said traction unit for rolling on the turf in propelling the lawnmower, and said reel unit having two ground rollers for mobily supporting said reel unit on the turf.

7. The articularly mounted battery-powered walk-behind reel lawnmower as claimed in claim 1, including:

an adjustable electric control connected between said battery and one of said motors for adjusting electric power to said one motor and thereby adjust the clip rate of grass cutting action of said reel unit.

8. A method of arranging an articularly mounted battery-powered walk-behind reel lawnmower comprising the steps of:

providing a traction unit supportable on turf to be mobile thereon, affixing a walk-behind operator handle to said traction unit for maneuvering said traction unit on the turf, mounting an electric battery on said traction unit, connecting an electric motor to said battery and to said traction unit for powering said traction unit on the turf, articularly connecting a grass cutting reel unit to said traction unit for pivotal movement of said reel unit relative to said traction unit and for propulsion movement in a direction of mowing and having a length extending transverse to said direction and with said length having two terminal ends, supporting said reel unit on the turf by providing a ground engagable roller rotatably mounted on said reel unit for contacting the turf and rolling thereon in constant contact therewith and thereby move up and down relative to said traction unit and in response to undulations in the turf and thereby pivot said reel unit upwardly both along the entire said length and also individually at each said terminal end in accord with mowing movement over the undulations, connecting an electric motor to said reel unit for powering said reel unit in mowing, and electrically connecting flexible electric wires between said battery and said reel unit for transmitting electricity to said electric motor on said reel unit and accommodating the pivoting of said reel unit.

9. The method of arranging an articularly mounted battery-powered walk-behind reel lawnmower as claimed in claim 8, including the step of:

adjustably controlling the electric power for one of said electric motors and thereby adjust the clip rate of grass cutting by said reel unit.

10. The method of arranging an articularly mounted battery-powered walk-behind reel lawnmower as claimed in claim 8, including the steps of:

pivoting said reel unit about an axis extending in the mowing direction, and moving said terminal ends up and down about said axis and also along said entire length of said reel unit while moving said units over the turf.

11. The method of arranging an articularly mounted battery-powered walk-behind reel lawnmower as claimed in claim 8, including the step of:

said supporting of said reel unit on said traction unit is arranged to present a forward portion and a rearward portion of said reel unit relative to the mowing direction and have said portions movable up and down relative to each other while mowing, and said supporting at said rearward portion being a lost motion relationship between said units.

12. An articularly mounted battery-powered walk-behind reel lawnmower comprising:

a traction unit movably supportable on turf to be mowed, a walk-behind operator handle attached to said traction unit for maneuvering said traction unit on the turf, an electric battery on said traction unit, an electric motor on said traction unit for traction-powering said traction unit on the turf, a grass cutting reel unit articularly connected to said traction unit for pivotal movement relative to said traction unit and for movement in a direction of mowing and having a length extending transverse to said direction and with said length having two terminal ends and with said reel unit having a rotatable grass-cutting reel, ground engagable roller support rotatably mounted on said reel unit for contacting the turf and rolling thereon in constant contact therewith and thereby move up and down relative to said traction unit and in response to undulations in the turf and thereby move said reel unit upwardly both along the entire said length and also individually at each said terminal end in accord with mowing movement over the undulations, an electric motor on said reel unit and being connected to said reel for powering said reel in cutting grass, articular connectors interconnected between said units for pivotal movement of said reel unit relative to said traction unit to effect the up and down movement of said reel unit relative to said traction unit, and flexible electric wires electrically connected between said battery and said reel unit for transmitting electricity to said electric motor on said reel unit and accommodating the movement of said reel unit relative to said traction unit.

13. The articularly mounted battery-powered walk-behind reel lawnmower as claimed in claim 12, wherein:

said connectors include a pivot post having a pivot axis extending in the mowing direction for pivotal movement of said reel unit relative to said traction unit, and said connectors including a link at each terminal end of said reel unit and being pivotally interconnected between said arm and said reel unit for transmitting the movement of said traction unit to said reel unit and for guiding said reel unit in up and down movement of said reel unit relative to said traction unit.

14. The articularly mounted battery-powered walk-behind reel lawnmower as claimed in claim 13, wherein:

each said link has a lower end which is bolted in its connection with said reel unit in and permits the up and down movement of said reel unit independent of said traction unit.

15. The articularly mounted battery-powered walk-behind reel lawnmower as claimed in claim 14, wherein:

said connectors include a flexible cable connected between said traction unit and said reel unit for upwardly supporting said reel unit relative to said traction unit and in a lost motion relationship whereby said reel unit moves up and down in the absence of said traction unit up and down movement.

16. The articularly mounted battery-powered walk-behind reel lawnmower as claimed in claim 15, including:

there being two of said ground engaging roller on said reel unit with one thereof being in a forward direction and the other thereof being in a rearward direction relative to the mowing direction.

17. The articularly mounted battery-powered walk-behind reel lawnmower as claimed in claim 12, including:

a traction drum included in said traction unit for rolling on the turf in propelling the lawnmower, and said reel unit having two ground rollers for mobily supporting said reel unit on the turf.

18. The articularly mounted battery-powered walk-behind reel lawnmower as claimed in claim 12, including:

an adjustable electric control connected between said battery and one of said motors for adjusting electric power to said one motor and thereby adjust the clip rate of grass cutting action of said reel.

19. An articularly mounted battery-powered walk-behind reel lawnmower comprising:

a traction unit movably supportable on turf to be mowed, a walk-behind operator handle attached to said traction unit for maneuvering said traction unit on the turf, an electric battery on said traction unit, an electric motor on said traction unit for traction-powering said traction unit on the turf, a grass cutting reel unit articularly connected to said traction unit for pivotal movement relative to said traction unit and for movement in a direction of mowing and having a length extending transverse to said direction and with said length having two terminal ends and with said reel unit having a rotatable grass-cutting reel, ground engagable roller means rotatably mounted on said reel unit for contacting the turf and rolling thereon in constant contact therewith and thereby move up and down relative to said traction unit and in response to undulations in the turf and thereby have said reel unit move up and down both along the entire said length and also individually at each said terminal end in accord with mowing movement over the undulations, a post and sleeve telescopic assembly on said units and having a telescopic axis disposed in the direction of mowing for transmitting the mowing movement between said units and accommodating the up and down movement of said terminal ends, an uprightly extending link at each said terminal end and being connected with said telescopic assembly and thereby accommodating the up and down movement along said reel unit length, the lower end of each said link being pivotally connected to said reel unit for accommodating the up and down movement along said entire length and presenting a pivot axis transverse to said mowing direction, a lost motion connection between said units for limiting the downward movement of said reel unit in the pivoting about said link pivot axis, an electric motor on said reel unit and being connected to said reel for powering said reel in cutting grass, and flexible electric wires electrically connected between said battery and said reel unit for transmitting electricity to said electric motor on said reel unit and accommodating the movement of said reel unit relative to said traction unit.

20. The articularly mounted battery-powered walk-behind reel lawnmower as claimed in claim 19, wherein:

said lost motion connection is a flexible cable connection.

21. The articularly mounted battery-powered walk-behind reel lawnmower as claimed in claim 19, including:

a mounting on said traction unit for supporting said battery thereon and having adjustable attachments between said mounting and said battery for adjustably positioning said battery for-and-aft of said traction unit in said mowing direction.

22. The articularly mounted battery-powered walk-behind reel lawnmower as claimed in claim 19, wherein:

said post and sleeve assembly and said arm pivotal connections are disconnectable and thereby arranged for releasing said reel unit from said traction unit for the substitution and pivotal connection of another implement in place of the reel unit.

* * * * *

UNITED STATES PATENT AND TRADEMARK OFFICE
CERTIFICATE OF CORRECTION

PATENT NO. : 6,487,837 B1
DATED : December 3, 2002
INVENTOR(S) : Alan R. Fillman et al.

It is certified that error appears in the above-identified patent and that said Letters Patent is hereby corrected as shown below:

Column 2,
Line 31, delete "in"

Column 3,
Line 64, delete "So the" and substitute -- The -- therefore

Column 4,
Lines 11 and 18, delete "So the" and substitute -- The -- therefore
Line 55, "reel unit 11," and substitute -- reel unit 11; --

Column 6,
Line 9, "roller" should be -- rollers --

Column 7,
Line 10, "have" should be -- having --
Line 12, "supporting" should be -- support --
Lines 54-55, after "of" there should not be a paragraph break
Line 55, there should be a paragraph break after "and"

Column 8,
Line 12, "roller" should be -- rollers --

Signed and Sealed this

Twenty-eighth Day of October, 2003

JAMES E. ROGAN
*Director of the United States Patent and Trademark Office*